(12) United States Patent
Frenzel et al.

(10) Patent No.: US 11,254,175 B2
(45) Date of Patent: Feb. 22, 2022

(54) SINGLE-SHELL SPRING CONTROL ARM

(71) Applicant: Autotech Engineering Deutschland GmbH, Bielefeld (DE)

(72) Inventors: Oliver Frenzel, Sassenberg (DE); Julian Niemann, Bielefeld (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 0 days.

(21) Appl. No.: 16/840,608

(22) Filed: Apr. 6, 2020

(65) Prior Publication Data

US 2020/0324599 A1    Oct. 15, 2020

(30) Foreign Application Priority Data

Apr. 11, 2019    (EP) ..................................... 19168696

(51) Int. Cl.
*B60G 7/00* (2006.01)
*B60G 7/02* (2006.01)
*B60G 13/00* (2006.01)

(52) U.S. Cl.
CPC ............. *B60G 7/001* (2013.01); *B60G 7/008* (2013.01); *B60G 7/02* (2013.01); *B60G 13/005* (2013.01); *B60G 2204/129* (2013.01); *B60G 2204/1244* (2013.01); *B60G 2204/143* (2013.01); *B60G 2204/148* (2013.01)

(58) Field of Classification Search
CPC .......... B60G 7/001; B60G 7/008; B60G 7/02; B60G 13/005; B60G 2204/1244; B60G 2204/129; B60G 2204/143; B60G 2204/148; B60G 2206/141; B60G 2206/16; B60G 2202/12; B60G 11/16; B60G 2206/722; B60G 2206/10
See application file for complete search history.

(56) References Cited

U.S. PATENT DOCUMENTS 4,840,396 A    6/1989 Kubo
7,261,307 B2   8/2007 Nuno et al.
(Continued)

FOREIGN PATENT DOCUMENTS

DE    102004008957 A1    9/2005
DE    102011000462 A1    8/2012
(Continued)

*Primary Examiner* — Drew J Brown
(74) *Attorney, Agent, or Firm* — The Webb Law Firm

(57) ABSTRACT

The invention relates to a single-shell spring control arm formed of sheet metal for a wheel suspension of a motor vehicle, with upwardly directed side limbs connected to one another by a base, with a first end section for connection to a chassis girder, with a second end section for wheel-side connection, with a spring receiving section, which is located between the two end sections and has a spring support surface formed on the base, and with a damper receiving section formed between the spring receiving section and the second end section for connecting a shock absorber. In order to achieve at relatively low component weight and favorable manufacturing costs improved stiffness with respect to high axle loads, the invention provides that a U-shaped constriction is formed between the spring support surface and the damper receiving section, which constriction extends in the base and in the side limbs.

15 Claims, 5 Drawing Sheets

(56) References Cited

U.S. PATENT DOCUMENTS

| | | | |
|---|---|---|---|
| 8,936,264 B2 | 1/2015 | Koormann et al. | |
| 9,895,947 B2 | 2/2018 | Meyer et al. | |
| 2006/0175788 A1* | 8/2006 | Nuno | B60G 3/20 280/124.153 |
| 2013/0175747 A1* | 7/2013 | Uemori | B60G 11/16 267/170 |
| 2014/0300074 A1* | 10/2014 | Koormann | B60G 7/001 280/124.151 |
| 2015/0008654 A1* | 1/2015 | Haselhorst | B60G 7/001 280/124.128 |
| 2015/0115561 A1* | 4/2015 | Nakasato | B60G 15/067 280/124.151 |
| 2016/0167472 A1* | 6/2016 | Meyer | B60G 7/001 280/124.125 |
| 2016/0280284 A1* | 9/2016 | Scholz | B60G 3/20 |
| 2017/0203624 A1* | 7/2017 | Mielke | B60G 7/02 |
| 2019/0263207 A1* | 8/2019 | Krolo | B21D 28/32 |
| 2019/0291522 A1* | 9/2019 | Leimkuhler | B60G 13/005 |
| 2020/0317013 A1* | 10/2020 | Friesen | B60G 7/001 |

FOREIGN PATENT DOCUMENTS

| | | |
|---|---|---|
| DE | 102014118518 A1 | 6/2016 |
| EP | 1642754 A1 | 5/2006 |
| GB | 2198398 A | 6/1988 |

* cited by examiner

SINGLE-SHELL SPRING CONTROL ARM

CROSS-REFERENCE TO RELATED APPLICATION

This application claims priority to European Patent Application No. 19168696.3 filed Apr. 11, 2019, the disclosure of which is hereby incorporated by reference in its entirety.

BACKGROUND OF THE INVENTION

Field of the Invention

The invention relates to a single-shell spring control arm formed of sheet metal for a wheel suspension of a motor vehicle, with upwardly directed side limbs connected to one another by a base, with a first end section for connection to a chassis girder, with a second end section for wheel-side connection, with a spring receiving section, which is located between the two end sections and has a spring support surface formed on the base, and with a damper receiving section formed between the spring receiving section and the second end section for connecting a shock absorber.

Description of Related Art

Spring control arms serve to guide a chassis wheel on a wheel suspension of a motor vehicle. They have a section for supporting a spring and a section for connecting a shock absorber or alternatively a section for supporting a spring/shock absorber arrangement, the spring or spring/shock absorber arrangement being supported against the bodywork.

A spring control arm of the above type is known from DE 10 2011 000 462 A1. The spring control arm, which was developed in the applicant's group of companies for motor vehicles having an internal combustion engine and designed for a certain maximum axle load, has proven itself well in practice. However, it has been shown that the spring control arm is not sufficiently rigid at the damper connection between the wheel-side connection and the spring support surface when used in similar motor vehicles with electric drive, where a significantly higher axle load occurs due to the high weight of the drive accumulator, and that it sometimes fails. The major reason for the component failure is seen in an excessive expansion or deformation of the side limbs in the x-direction (i.e. in the horizontal longitudinal direction of the vehicle) due to an excessive axle load in the z-direction (i.e. along the vertical vehicle vertical axis).

A known measure to improve the stiffness, especially the bending stiffness, of a spring control arm exposed to high axle loads is the use of steel sheet of higher material thickness in the production of the spring control arm. However, an increase in material thickness leads to a considerable increase in weight per spring control arm and higher material costs. Another known measure for achieving a high load capacity of the spring control arm in the area of the spring support is the attachment of one or more reinforcing additional metal sheets, especially bridge plates (see e.g. DE 10 2004 008 957 A1 and DE 10 2014 118 518 A1). However, the manufacture of such additional metal sheets requires corresponding manufacturing steps, which is unfavourable with regard to the manufacturing costs. In addition, well-known multi-part spring control arms sometimes have a relatively high component weight due to their reinforcing additional metal sheets.

Based on this, the invention is based on the object to create a spring control arm of the type mentioned above, which has improved stiffness with respect to high axle loads at a relatively low component weight and favorable manufacturing costs.

SUMMARY OF THE INVENTION

To solve this object, a spring control arm is proposed.

The single-shell spring control arm according to the invention is characterized in that a U-shaped constriction is formed between the spring support surface and the damper receiving section, which constriction extends in the base and in the side limbs of the spring control arm. The U-shaped constriction may also be referred to as a U-shaped bead.

The U-shaped constriction (bead) makes it possible to achieve a spring control arm of the generic type with significantly improved stiffness with regard to high axle loads. Since neither the material thickness of the sheet metal used to manufacture the spring control arm needs to be increased nor do bridge plates or other reinforcing additional metal sheets need to be added to the spring control arm, the spring control arm can be supplied with a relatively low component weight and favorable manufacturing costs.

In a preferred design of the spring control arm according to the invention, the constriction is defined by a main plane, a second plane and a third plane, the main plane being tangential to the underside of the base opposite the spring support surface, the second plane extends above and parallel to the main plane and through the high point of the constriction in the underside of the base, the third plane being parallel to the main plane and passing through a point of intersection, wherein the point of intersection is an intersection of a straight line with a lower outer contour line of one of the side limbs, the straight line extends perpendicular to the main plane and through a center of a mounting hole formed in the damper receiving portion and serving to connect the shock absorber, and wherein the second plane is spaced relative to the main plane and the third plane is spaced relative to the second plane.

The third plane may also be referred to as the damper plane or damper reference plane. The third plane (damper plane) can extend in, below or above the main plane. Preferably the distance of the third plane to the second plane is greater than the distance of the second plane to the main plane.

As far as in the present description of the spring control arm according to the invention the terms "up", "upwardly", "above", "below", "underside" and/or "high point" are used, these terms refer to the usual mounting position of the spring control arm. In particular, the term "high point of the constriction in the underside of the base" means the point of the constriction in the underside of the base of the control arm where the constriction in the usual mounting position of the control arm has its greatest profile depth in the underside of the base of the control arm.

A further configuration of the spring control arm according to the invention, the respective side limb of which defines an upper edge, is characterized in that the distance of the upper edge relative to the base at the constriction has a minimum. This configuration has proved to be very advantageous in order to achieve a spring control arm according to the invention, which has improved rigidity with regard to high axle loads at relatively low component weight and favourable manufacturing costs.

A further advantageous design of the spring control arm, whose side legs define flanks facing each other, is characterized by the fact that the distance between the flanks at the constriction is smaller than the distance between the flanks at the damper receiving section. This design also contributes to improved rigidity with respect to high axle loads, in particular when the distance between the flanks at the constriction is at least 3 mm, preferably at least 5 mm, smaller than the distance between the flanks at the damper receiving section.

Furthermore, it has proved to be favourable for a high rigidity of the spring control arm at constant or low component weight if, according to a further design of the spring control arm, the distance of its flanks from each other at the constriction is greater than the distance of the flanks from each other at the second end section of the spring control arm. In this respect, it is proposed in particular that the distance between the flanks at the constriction is at least 5 mm, preferably at least 8 mm greater than the distance between the flanks at the second end section.

According to an alternative design of the spring control arm, the distance of its flanks from each other at the constriction can also be smaller than or equal to the distance of the flanks from each other at the second end section of the spring control arm. For example, the distance between the flanks at the constriction may be at least 3 mm, preferably at least 5 mm smaller than the distance between the flanks at the second end section.

In order to prevent a critical widening or deformation of the side limbs of the spring control arm as far as possible as a result of high axle loads in the z-direction (vehicle vertical axis) without increasing the component weight of the spring control arm, a further configuration of the invention provides that a depth (profile depth) of the constriction relative to the above-mentioned main plane is in the range from 1.5 mm to 40 mm, preferably in the range from 5 mm to 40 mm, particularly preferably in the range from 10 mm to 40 mm.

A further configuration of the invention provides that a depth (profile depth) of the constriction relative to the above-mentioned third plane (damper plane) is in the range from 1.5 mm to 45 mm, preferably in the range from 5 mm to 45 mm, particularly preferably in the range from 10 mm to 45 mm.

According to a further design of the spring control arm according to the invention, the distance between the flanks first increases starting from the constriction towards the damper receiving section and then decreases in the direction of mounting holes formed in the side limbs which serve to connect the shock absorber. This further improves the stiffness of the relatively lightweight spring control arm at low manufacturing costs.

A further advantageous design of the spring control arm according to the invention is characterized in that the respective side limb has an outwardly projecting flange at its upper edge, which is designed with different widths along the side limb and has its greatest width at the constriction. This further optimizes the stiffness of the spring control arm against expansion or deformation of the side limbs under high axle loads. Preferably, the flange of the respective side limb extends continuously from the first end section to the second end section of the spring control arm. An even higher stiffness of the spring control arm can be achieved if, according to a further design of the spring control arm, the flange has an outer edge that is bent downwards relative to its upper side and extends at least along the spring receiving section and the damper receiving section.

In another advantageous design of the spring control arm, the side limbs define a fork-shaped bearing section for connecting a wheel carrier and for connecting the shock absorber. The fork-shaped bearing section delimits a niche-shaped cutout which extends from the second end section to a point located between the fixing holes, which serve to connect the shock absorber, and the constriction. The connection of the shock absorber to the side limbs of the spring control arm increases the rigidity of the shock absorber against expansion of the side limbs. The niche-shaped cut-out in the fork-shaped bearing section reduces the component weight of the spring control arm.

It is also advantageous for the stiffness of the relatively light-weight spring control arm if, according to a further design, flange-shaped webs facing one another are formed on the fork-shaped bearing section, which webs delimit the niche-shaped cut-out.

In a further advantageous design of the spring control arm, its spring support surface has an opening at which an inwardly projecting collar is formed. When the spring control arm is assembled, the collar projects into the spring (coil spring) supported on the spring support surface. Preferably, the upper edge of the collar is shaped radially inwards so that the upper, circumferential edge of the collar projects radially inwards relative to a lower annular section of the collar. The collar can serve as a centering projection for the spring supported on the spring control arm. The collar also improves the stiffness of the spring control arms.

Another design of the spring control arm provides for that beads facing one another are formed in the side limbs between the damper receiving section and the second end section. The beads are designed in such a way that the distance between the flanks of the side limbs first increases from the damper receiving section towards the second end section and then decreases towards fixing holes used to connect a wheel carrier. These beads further improve the stiffness of the spring control arm at relatively low component weight and favorable manufacturing costs.

A further advantageous design of the spring control arm is characterized in that the side limbs at the first end section of the spring control arm define a fork-shaped bearing section for connecting the spring control arm to a chassis girder, the fork-shaped bearing section having aligned openings with collars for receiving a bearing bush. The collars, which may also be referred to as rims, are preferably directed inwards, i.e. facing one another.

According to a further advantageous design of the spring control arm, an elongated opening is formed in the base of the spring control arm between the spring support surface and the first end section, which serves to connect the spring control arm to a chassis girder, which opening extends substantially parallel to the longitudinal central axis of the spring control arm. The length of this opening is preferably significantly greater than the distance between the flanks of the side limbs at the constriction or at the damper receiving section and/or than the diameter of the opening formed in the spring support surface. The longitudinal edges of the elongated opening preferably run substantially or sectionally diverging from each other, their distance increasing in the direction of the spring support surface. The component weight of the spring control arm is considerably reduced by the elongated opening.

The spring control arm according to the invention is manufactured, according to a further configuration of the invention, from steel sheet with a yield strength of at least 600 MPa, preferably at least 700 MPa, particularly preferably at least 750 MPa.

BRIEF DESCRIPTION OF THE DRAWINGS

In the following, the invention is explained in more detail by means of a drawing representing an example of design. In the drawing

DESCRIPTION OF THE INVENTION

Figure 1:
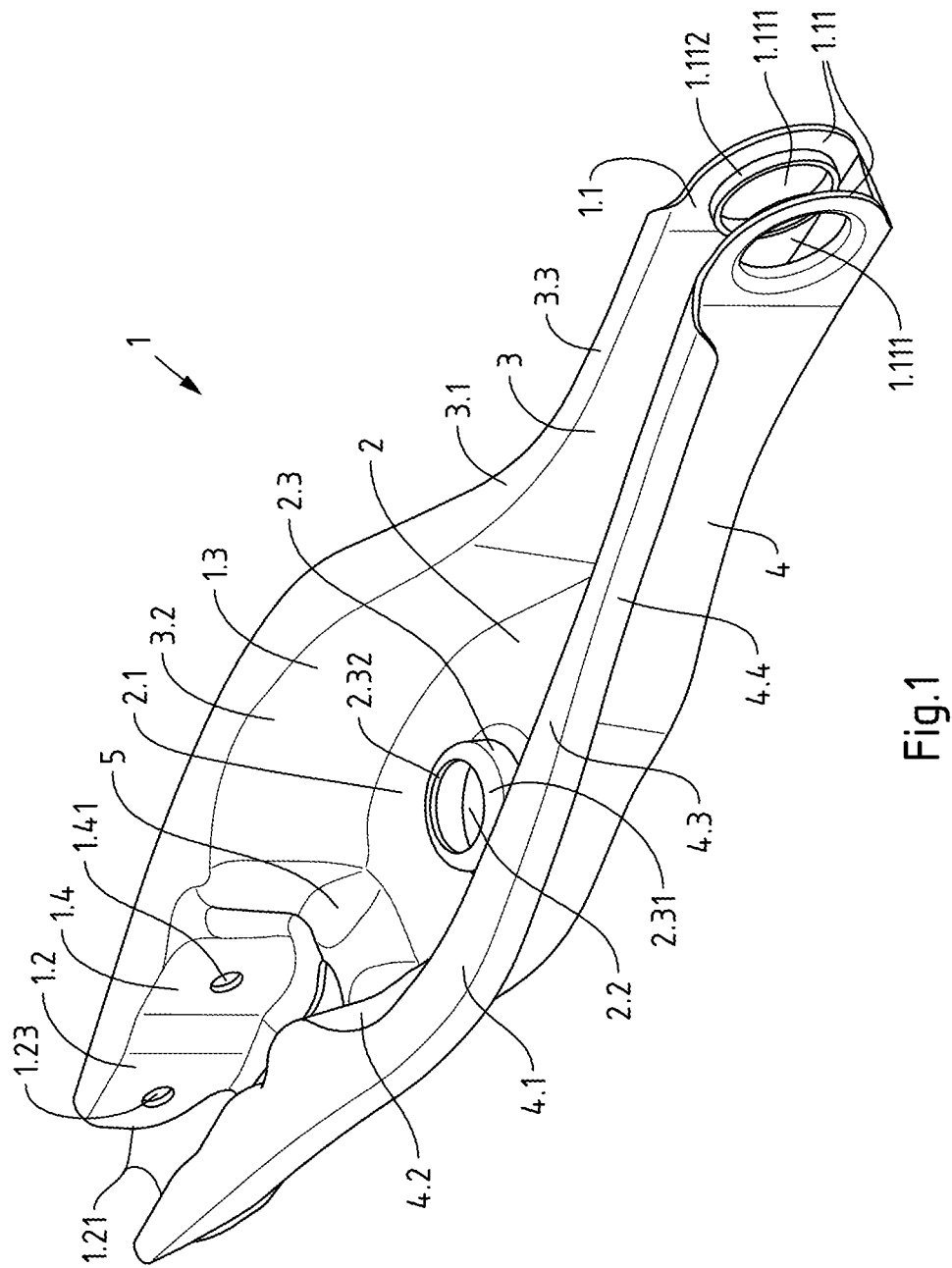
FIG. 1 shows a spring control arm according to the invention in a perspective view.

The drawing shows a spring control arm 1 for a wheel suspension of a motor vehicle. The spring control arm 1 has upwardly directed side limbs 3, 4 connected by a base 2 and is manufactured as a single-shell component from a metal plate by punching and forming. It has a first end section 1.1 for connection to a chassis girder and a second end section 1.2 for connection on the wheel side. Between the two end sections 1.1, 1.2 there is a spring receiving section 1.3 which has a spring support surface 2.1 formed on the base 2 for supporting a spring (helical spring) (not shown here). Furthermore, the spring control arm 1 has a damper receiving section 1.4 between the spring receiving section 1.3 and the second end section 1.2 for connecting a shock absorber (not shown here).

The spring control arm 1 is made of high-strength sheet metal, preferably high-strength sheet steel. The metal sheet or steel sheet used for its manufacture has a yield strength of at least 600 MPa, preferably at least 700 MPa, for example at least 800 MPa. The thickness of the metal sheet or steel sheet used is, for example, in the range from 2.0 mm to 3.0 mm, preferably in the range from 2.0 mm to 2.6 mm.

Figure 5:
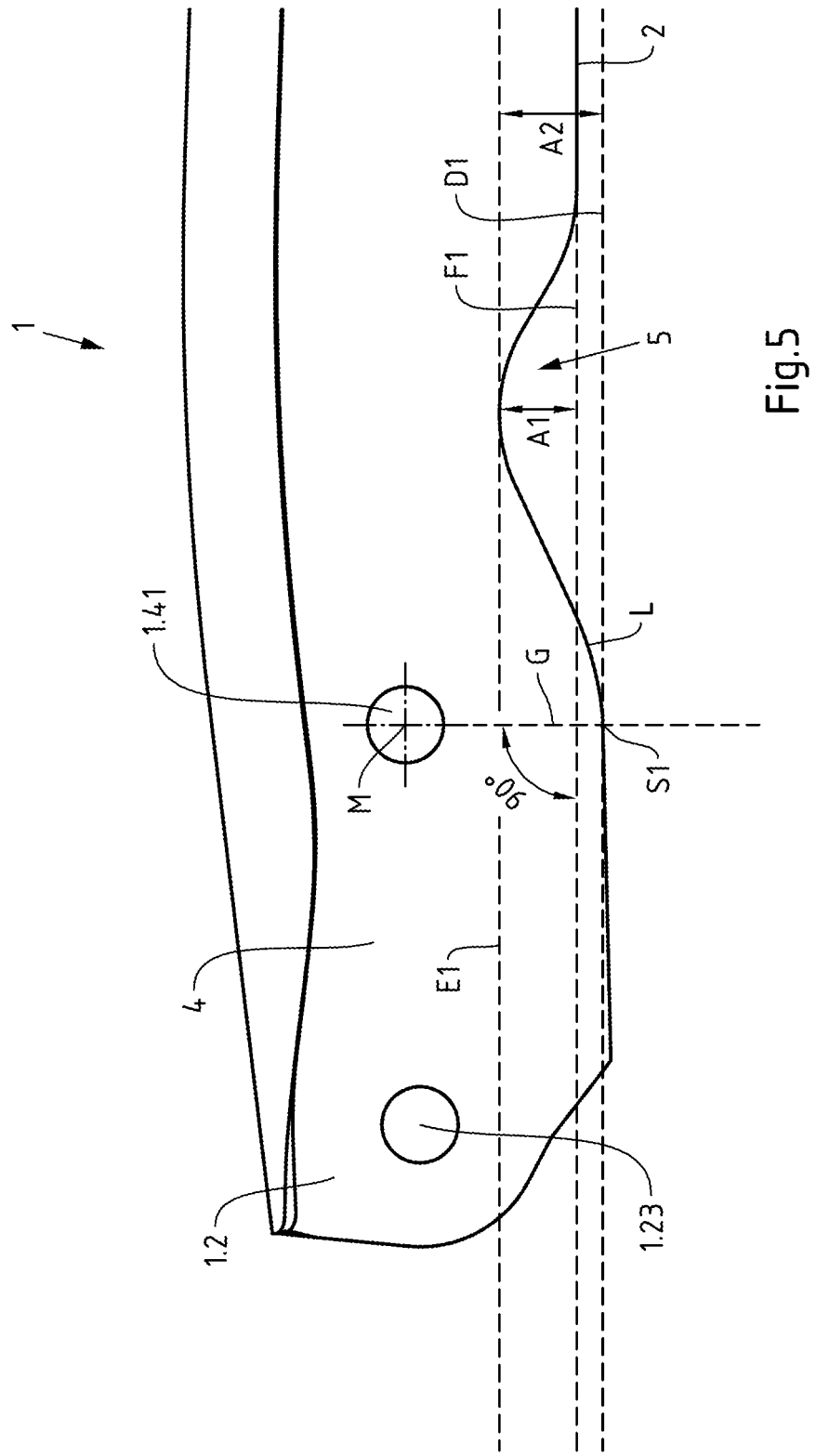
FIG. 5 shows a simplified side view of a section of the spring control arm from FIG. 2, with the end section for connecting the spring control arm on the wheel side, the damper receiving section for connecting a shock absorber and the U-shaped constriction.

Between the spring supporting surface 2.1 and the damper receiving section 1.4 a U-shaped constriction 5 is formed which runs in the bottom 2 and in the side limbs 3, 4. The constriction 5 can be defined by reference planes. As sketched in FIG. 5, the constriction 5 can be defined, for example, by a main plane (main reference plane) F1, a second plane E1 and a third plane D1, the main plane F1 being tangential to the underside which lies on the opposite of to the spring support surface 2.1, the second plane E1 extends above and parallel to the main plane F1 and through the high point of the constriction 5 in the underside of the base 2, the third plane D1 extending parallel to the main plane F1 and passing through a point of intersection Si, the point of intersection Si being an intersection of a straight line G with a lower outer contour line L of one of the side limbs 4, the straight line G running perpendicular to the main plane F1 and through a center M of a fixing hole 1.41 formed in the damper receiving portion 1.4 and serving to connect the shock absorber. The constriction 5 is realized, for example, when the second plane E1 is spaced relative to the main plane F1 and the third plane D1 is spaced relative to the second plane E1. In other words, constriction 5 is present if the distance A1 of the second plane E1 from the main plane F1 and the distance A2 of the third plane D1 from the second plane E1 are both greater than zero, the smaller distance A1 corresponding to the depth of constriction 5 in base 2. For example, the depth of the constriction 5 in the base 2 of the spring control arm 1 may be in the range from 1.5 mm to 40 mm, in particular in the range from 8 mm to 16 mm. The distance A2 of plane D1 to plane E1 is preferably greater than the distance A1 of the second plane E1 to the main plane F1.

Figure 2:
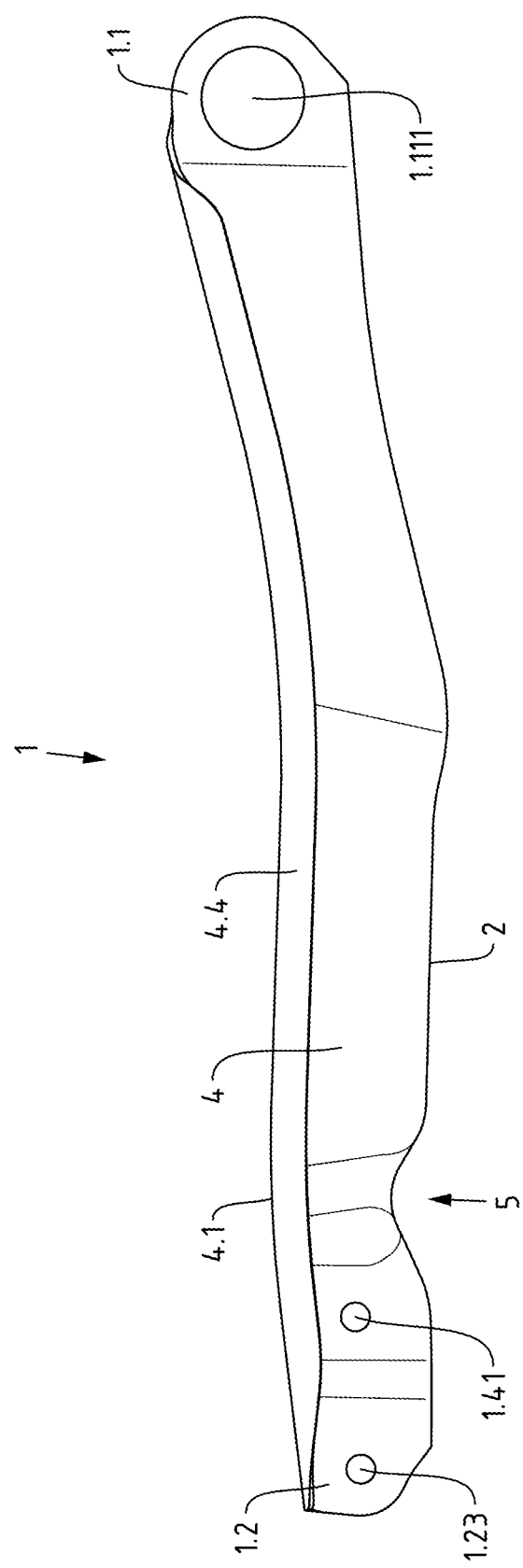
FIG. 2 shows the spring control arm from FIG. 1 in a side view.

The respective side limb 3, 4 of the spring control arm 1 defines an upper edge 3.1, 4.1. In FIG. 2 it can be seen that the distance of the upper edge 4.1 relative to the base 2 has a minimum at the constriction 5. Furthermore, the side limbs 3, 4 define flanks 3.2, 4.2 facing to one another. At the constriction the distance of the flanks 3.2, 4.2 from the upper edge 3.1, 4.1 gradually decreases towards the base 2. In FIGS. 3 and 4A to 4C it can be seen that the average distance A3 of the flanks 3.2, 4.2 from each other at the constriction 5 is smaller than the distance A4 of the flanks 3.2, 4.2 at the damper receiving section 1.4. The distance A3 of the flanks 3.2, 4.2 at the constriction 5 may, for example, be at least 3 mm smaller, preferably at least 5 mm smaller than the distance A4 of the flanks 3.2, 4.2 at the damper receiving section 1.4.

Furthermore, the spring control arm 1 is designed, for example, in such a way that the distance A3 of the flanks 3.2, 4.2 at the constriction 5 is greater than the distance A5 of the flanks 3.2, 4.2 at the second end section 1.2. For example, the distance A3 of the flanks 3.2, 4.2 at the constriction 5 can be at least 5 mm greater, preferably at least 8 mm greater than the distance A5 of the flanks 3.2, 4.2 at the second end section 1.2.

Figure 3:
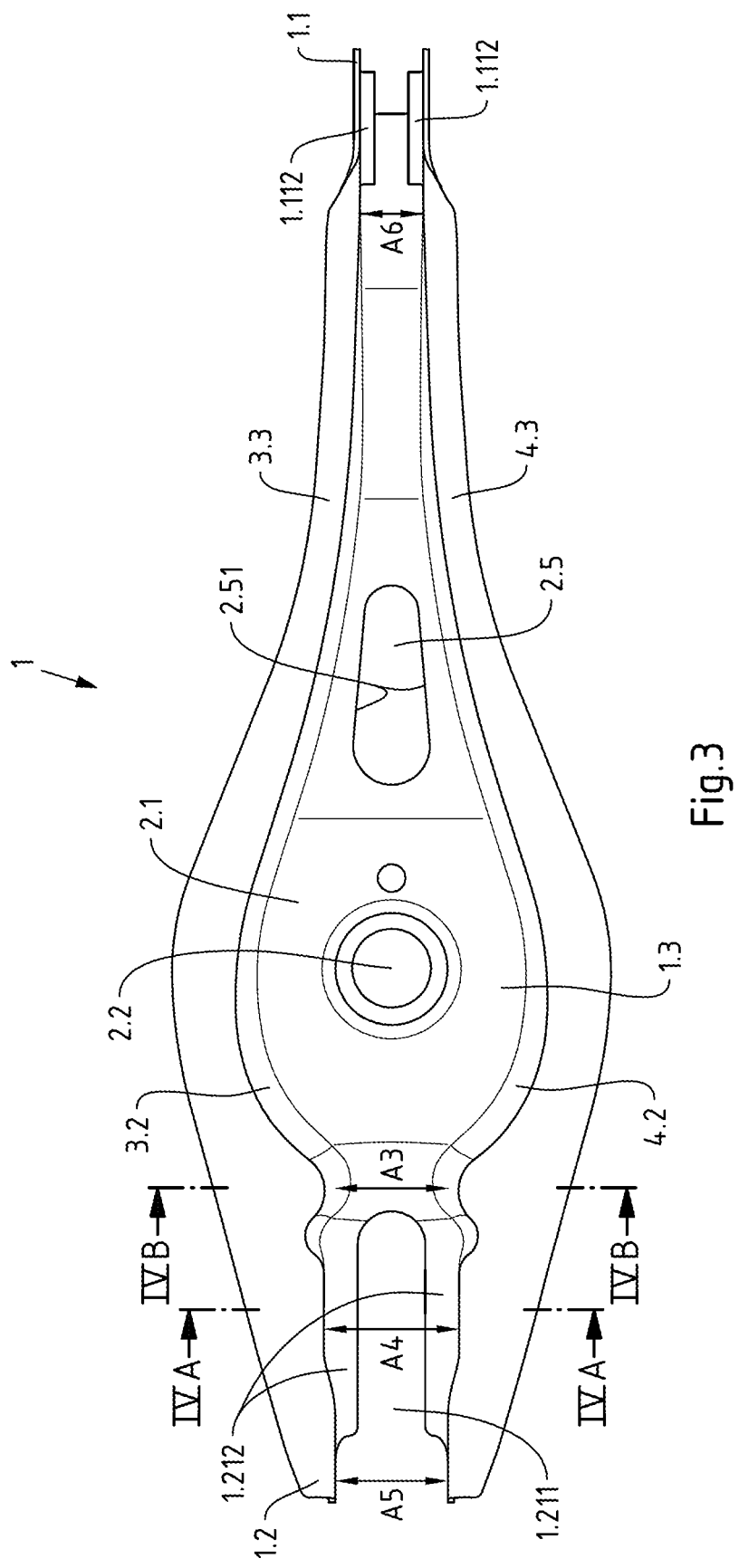
FIG. 3 shows the spring control arm from FIG. 1 in a top view.
Figure 4A:
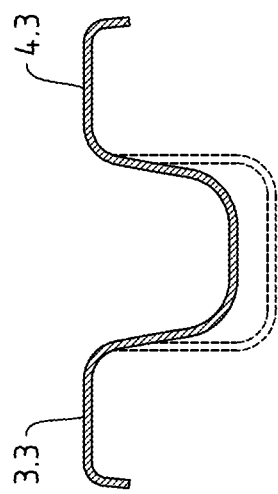
FIG. 4A shows a cross-sectional view of the spring control arm along the intersection line IVA-IVA in FIG. 3.
Figure 4B:
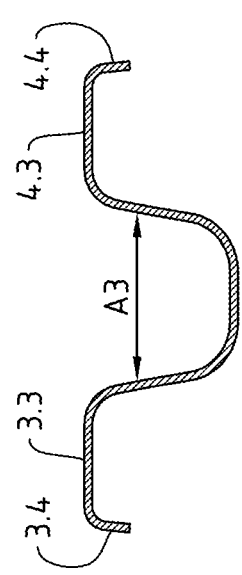
FIG. 4B shows a cross-sectional view of the spring control arm along the intersection line IVB-IVB in FIG. 3.
Figure 4C:
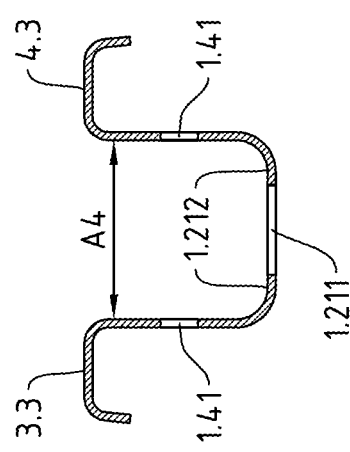
FIG. 4C shows the cross-sectional view of FIG. 4B superimposed on the cross-sectional view of FIG. 4A.

Starting from the constriction 5, the distance A3 of the flanks 3.2, 4.2 in the direction of the damper receiving section 1.4 first increases and from a certain point decreases in the direction of the fixing holes 1.41 formed in the side limbs 3, 4, which serve to connect a shock absorber (not shown) (cf. FIGS. 1 and 3).

The respective side limb 3, 4 of the spring control arm 1 has an outwardly projecting flange 3.3, 4.3 on its upper edge 3.1, 4.1. Preferably, the flange 3.3, 4.3 extends essentially continuously from the first end section 1.1 to the second end section 1.2 of the spring control arm 1. The flange 3.3, 4.3 has a different width along the respective side limb 3, 4 and has its greatest width at the constriction 5 (see FIG. 3). In addition, flange 3.3, 4.3 has an outer edge 3.4, 4.4 which is bent downwards relative to its upper side. The downward bent outer edge 3.4, 4.4 extends essentially over the entire length of the flange 3.3, 4.3.

At its end section 1.2 serving to connect a wheel carrier, the spring control arm 1 has a fork-shaped bearing section 1.21 defined by the side limbs 3, 4, which additionally serves to connect a shock absorber. The fork-shaped bearing section 1.21 delimits a niche-shaped cut-out 1.211 which extends from the second end section 1.2 to a point located between fixing holes 1.41 and the constriction 5. On the bearing section 1.21 flange-shaped webs 1.212 are formed facing each other, which delimit the niche-shaped cutout 1.211.

The spring support surface 2.1 has an opening 2.2 on which an inwardly projecting collar 2.3 is formed. The upper edge 2.31 of the collar 2.3 is preferably shaped radially inwards so that the upper peripheral edge 2.32 of the collar 2.3 projects radially inwards relative to a lower annular section of the collar 2.3.

At the first end section 1.1 of the spring control arm 1 the side limbs 3, 4 define a fork-shaped bearing section 1.11 for connecting the spring control arm to a chassis girder. The fork-shaped bearing section 1.11 has aligned openings 1.111 with collars 1.112 to receive a bearing bush. The collars 1.112 are preferably directed inwards. The distance A6 of the side limbs 3, 4 on the fork-shaped bearing section 1.11 is clearly smaller than the distance A5 of the side limbs 3, 4 on the second end section 1.2 of the spring control arm 1.

In the base 2 of the spring control arm 1, between the first end section 1.1 and the spring support surface 2.1, an elongated opening (through-opening) 2.5 is formed which extends substantially parallel to the longitudinal centre axis of the spring control arm 1. The length of this opening 2.5 is clearly greater than the distance A4 of the flanks 3.2, 4.2 of the side limbs 3, 4 at the damper receiving section 1.4. The longitudinal edges 2.51 of the opening 2.5 run substantially or sectionally divergent to one another, their distance increasing towards the spring support surface 2.1.

The execution of the spring control arm 1 according to the invention is not limited to the embodiment shown in the drawing. Rather, numerous variants are conceivable which, even if the design deviates from the example shown, make use of the invention specified in the claims. For example, in the side limbs 3, 4, between the damper receiving section 1.4 and the second end section 1.2, beads facing each other may be formed. The beads are preferably formed in such a way that the distance between the flanks 3.2, 4.2 of the side limbs 3, 4 first increases from the damper receiving section 1.4 in the direction of the second end section 1.2 and then decreases towards the fixing holes 1.23.

The invention claimed is:

1. A single-shell spring control arm formed of sheet metal for a wheel suspension of a motor vehicle
    with upwardly directed side limbs connected to one another by a base,
    with a first end section for connection to a chassis girder,
    with a second end section for wheel-side connection,
    with a spring receiving section, which is located between the two end sections and has a spring support surface formed on the base, and
    with a damper receiving section formed between the spring receiving section and the second end section for connecting a shock absorber,
    characterized in that a U-shaped constriction is formed between the spring support surface and the damper receiving portion, which constriction extends in the base and in the side limbs.

2. The spring control arm according to claim 1, characterized in that the constriction is defined by a main plane, a second plane and a third plane, the main plane being tangential to the underside of the base opposite the spring support surface,
    wherein the second plane extends above and parallel to the main plane and through the high point of the constriction in the underside of the base,
    the third plane being parallel to the main plane and passing through a point of intersection,
    wherein the point of intersection is a point of intersection of a straight line with a lower outer contour line of one of the side limbs,
    wherein the straight line extends perpendicular to the main plane and through a center of a fixing hole formed in the damper receiving portion and serving to connect the shock absorber, and
    wherein the second plane is spaced relative to the main plane and the third plane is spaced relative to the second plane.

3. The spring control arm according to claim 1, wherein the respective side limb defines an upper edge, and wherein the distance of the upper edge relative to the base at the constriction has a minimum.

4. The spring control arm according to claim 1, wherein the side limbs define flanks facing each other, and wherein the distance of the flanks from each other at the constriction is smaller than the distance of the flanks from each other at the damper receiving portion.

5. The spring control arm according to claim 4, characterized in that the distance between the flanks at the constriction is at least 3 mm smaller than the distance between the flanks at the damper receiving portion.

6. The spring control arm according to claim 4, characterized in that the distance between the flanks at the constriction is smaller than or equal to the distance between the flanks at the second end section.

7. The spring control arm according to claim 4, characterized in that the distance between the flanks at the constriction is at least 3 mm smaller than the distance between the flanks at the second end section.

8. The spring control arm according to claim 1, characterized in that a depth of the constriction relative to the main plane is in the range of 1.5 mm to 40 mm.

9. The spring control arm according to claim 1, characterized in that the distance of the flanks, starting from the constriction, first increases towards the shock absorber receiving section and then decreases in the direction of fixing holes formed in the side limbs, which serve to connect the shock absorber.

10. The spring control arm according to claim 1, characterized in that the respective side limb has an outwardly projecting flange at its upper edge, which flange is formed with different widths along the side limb and has its greatest width at the constriction.

11. The spring control arm according to claim 10, characterized in that the flange has an outer edge which is bent downwards relative to its upper side and extends at least along the spring receiving section and the damper receiving section.

12. The spring control arm according to claim 1, characterized in that the side limbs define a fork-shaped bearing section for connecting a wheel carrier and for connecting the shock absorber, the fork-shaped bearing section delimiting a niche-shaped cutout which extends from the second end section to a point located between fixing holes, which serve to connect the shock absorber, and the constriction.

13. The spring control arm according to claim 12, characterized in that flange-shaped webs facing one another are formed on the fork-shaped bearing section, which webs limit the niche-shaped cutout.

14. The spring control arm according to claim 1, characterized in that beads facing one another are formed in the side limbs between the damper receiving section and the second end section.

15. The spring control arm according to claim 1, characterized in that a depth of the constriction relative to the third plane is in the range from 1.5 mm to 45 mm, preferably in the range from 5 mm to 45 mm.

* * * * *